March 27, 1928.
J. O. GOODWIN
1,663,756
TUBE MAKING APPARATUS
Filed Aug. 21, 1925
3 Sheets-Sheet 1
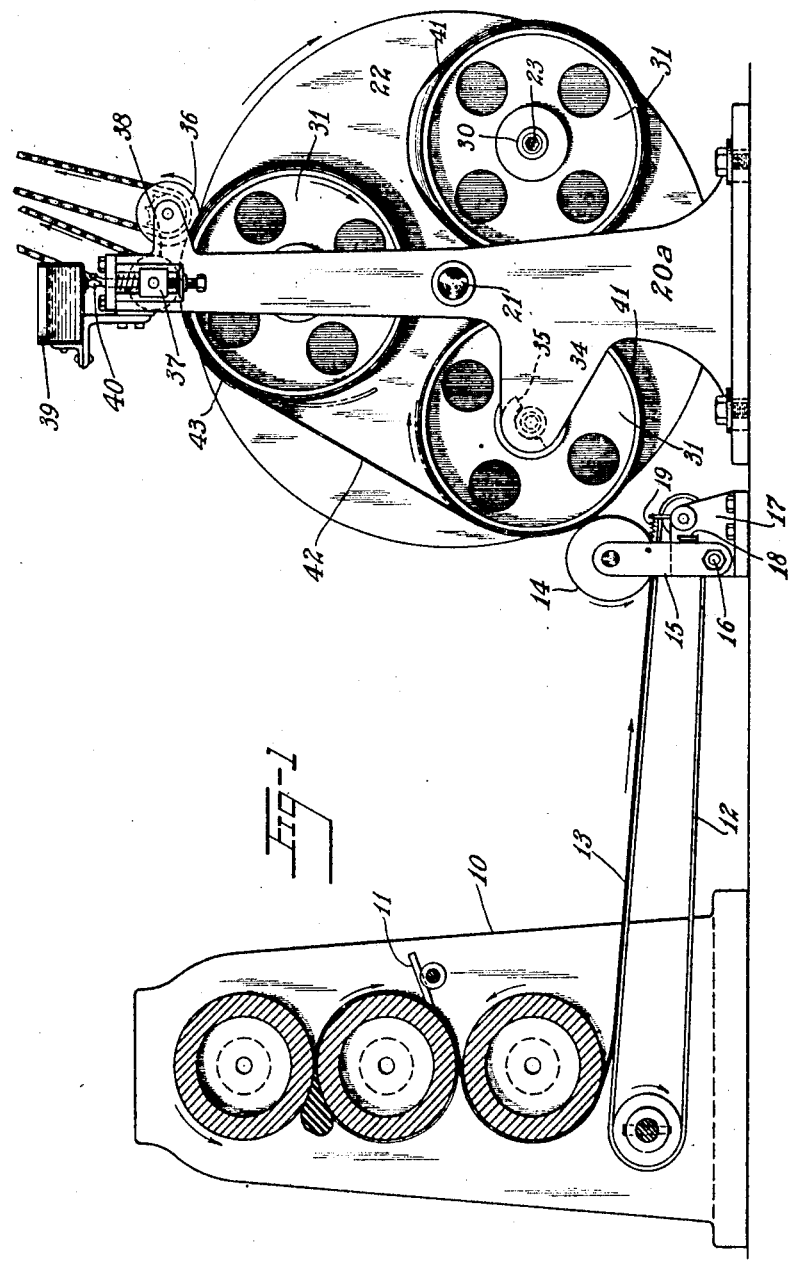
Inventor
John O. Goodwin
By Pierson, Eakin & Avery
Att'ys.

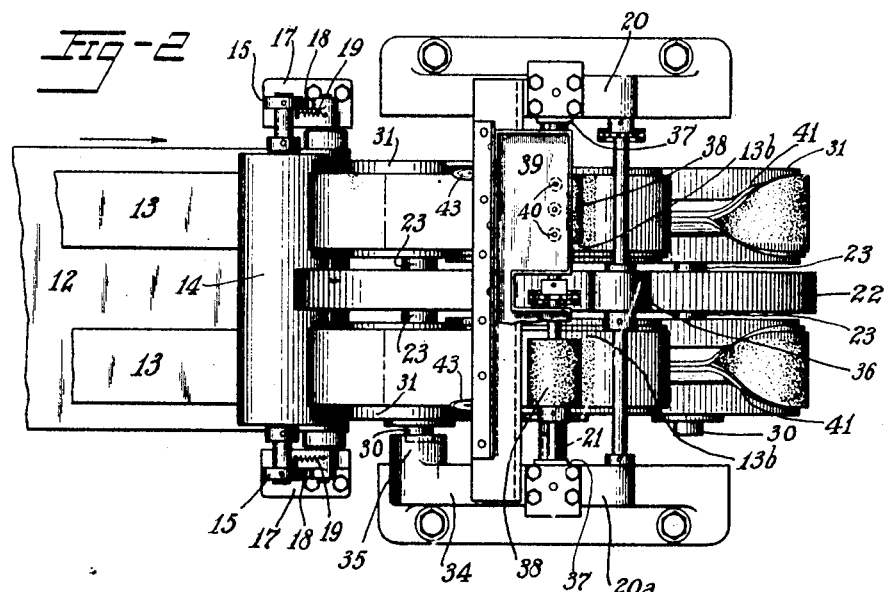
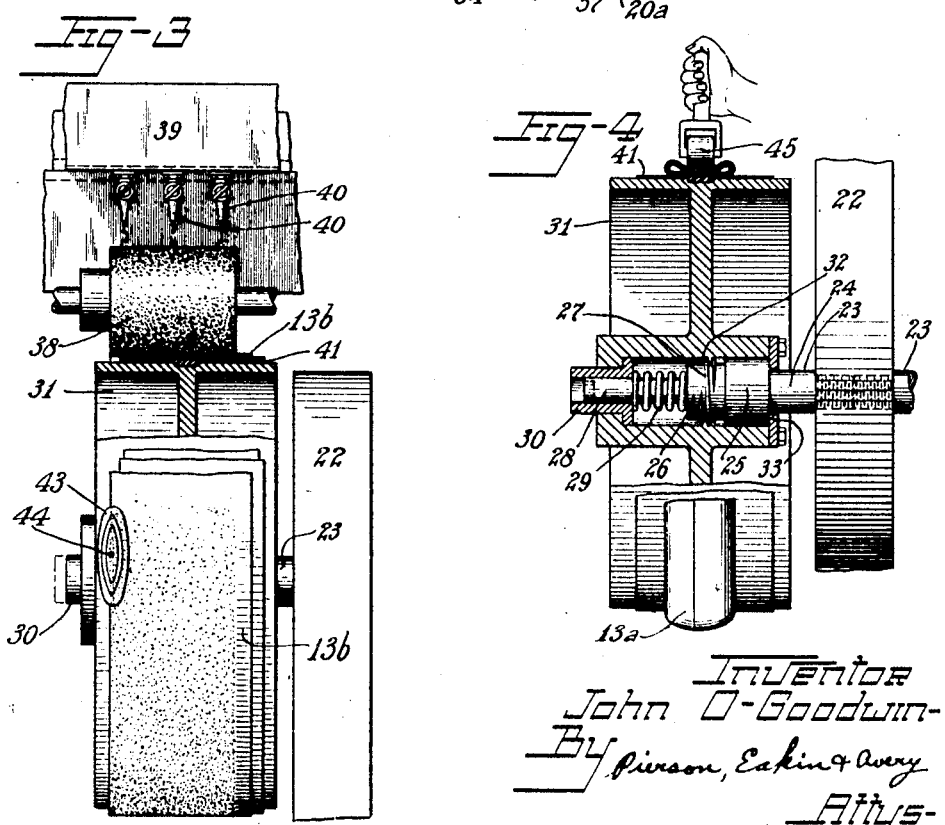

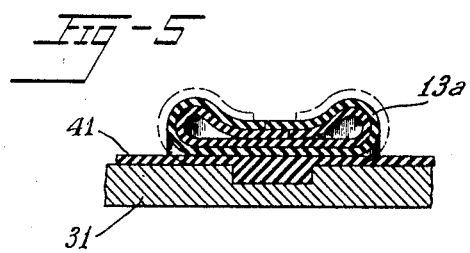
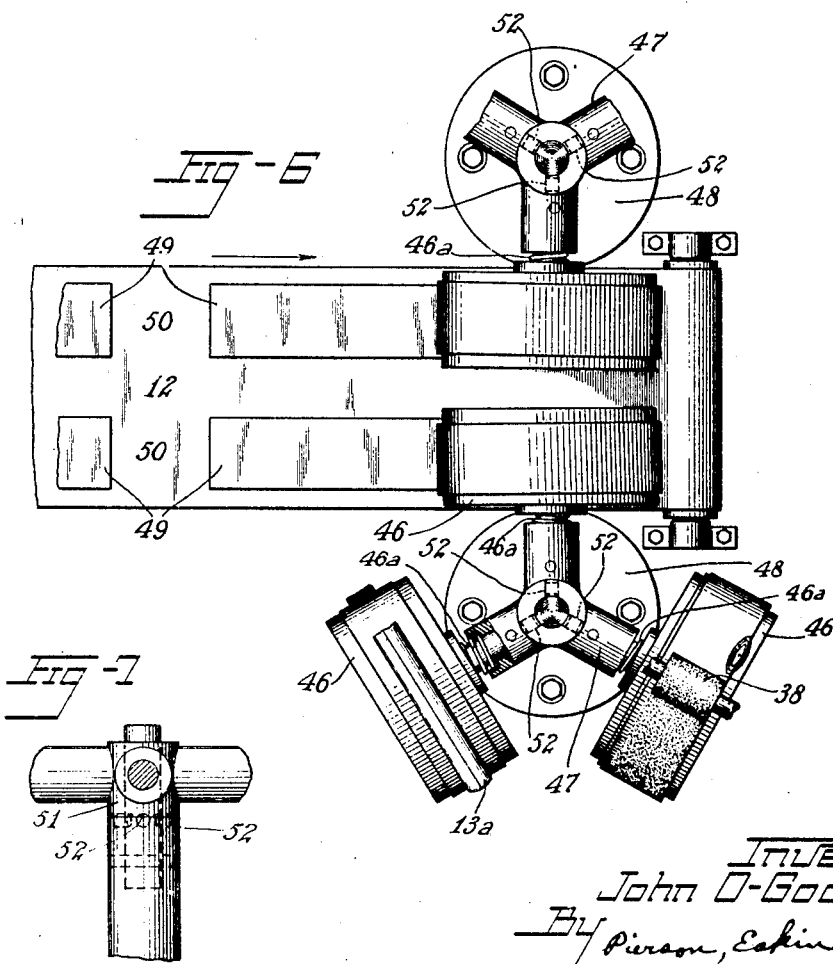

Patented Mar. 27, 1928.

1,663,756

UNITED STATES PATENT OFFICE.

JOHN O. GOODWIN, OF AKRON, OHIO, ASSIGNOR TO THE B. F. GOODRICH COMPANY, OF NEW YORK, N. Y., A CORPORATION OF NEW YORK.

TUBE-MAKING APPARATUS.

Application filed August 21, 1925. Serial No. 51,580.

This invention relates to the art of manufacturing tubes such as inner tubes for tires.

It heretofore has been proposed to make such tubes by feeding a strip of sheeted rubber stock from a calender onto a drum, the drum being so rotated and the stock so guided thereonto as to produce a lateral offset of successive plies, and bending over and joining in interfitted relation the stepped margins of the laminated endless band thus produced, to obtain an endless, longitudinally seamed tube.

My general object is to provide improved apparatus for rapidly and economically producing endless, longitudinally seamed tubes. More specific objects are to provide tube-forming apparatus adapted to receive the stock continuously from the calender and to be operated with a comparatively small amount of hand labor; to provide tube-forming apparatus adapted to provide for convenient performance of successive operations upon the stock at different stations; and to provide for the concurrent manipulation at closely adjacent positions of a plurality of stock strips led from the same calender, so as to utilize a comparatively large part of the capacity of the calender.

Of the accompanying drawings:

Fig. 1 is an elevation, with parts in section, of one preferred embodiment of my invention.

Fig. 2 is a plan view of the tube-forming portion of this embodiment.

Fig. 3 is an elevation of parts of the tube-forming apparatus at a pressing and coating station, from the right of Fig. 1 or Fig. 2, parts being sectioned and broken away.

Fig. 4 is an elevation, from the right of Fig. 1 or Fig. 2, of parts of the tube-forming apparatus at a folding and seaming station, parts being sectioned and broken away.

Fig. 5 is a fragmentary section of one of the tube-building drums and the work thereon, showing the manner in which the endless band of stock is folded over and seamed.

Fig. 6 is a plan view of parts of another preferred embodiment of my invention.

Fig. 7 is a fragmentary elevation of the turret and its mounting shown in Fig. 6.

Referring first to the embodiment shown in Figs. 1 to 5 of the drawings, the apparatus comprises a calender 10 provided with slitting knives such as the knife 11 for delivering onto a belt conveyor 12 two continuous strips 13, 13, of sheeted rubber stock. At the delivery end of the conveyor a guide and presser roll 14 is journaled between the upper ends of a pair of arms 15, 15, which are pivoted at 16, at their lower ends, upon floor brackets 17, 17, and are urged toward stops 18, 18 on said brackets by pull springs 19, 19, through which they are connected to the respective brackets, the roll thus being so supported as to be peripherally driven, through the stock strips 13, by the conveyor, and to guide the two stock strips 13 as the latter are drawn upward from the delivery end of the conveyor.

Mounted just beyond the delivery end of the conveyor are a pair of journal standards 20, 20ª, in which is mounted a shaft 21 having journaled thereon at its middle a turret 22. At each of three positions equally spaced about the axis of the turret a pair of stub shafts, 23, 23, are screwed into and project from opposite sides of the turret. Each stub-shaft is formed, from its base toward its outer end, (Fig. 4) with a neck 24, an enlarged journal portion 25, a reduced portion 26 formed at its middle with an open ended, male screw thread 27 of two turns, and with a further reduced centering and spring-post portion 28. A helical compression spring 29 is mounted upon the reduced portion 28 of the stub shaft, between the screw threaded portion 26 and a flanged bushing 30 slidably mounted upon and projecting beyond the outer end portion of the stub-shaft and retained and controlled as to its position thereon by engagement of its flange with an inwardly extending flange formed on the hub of a tube-building drum 31 which is journaled upon the bushing and upon the journal portion 25 of the stub-shaft. The hub of the drum is formed with an internal screw thread 32 adapted to coact with the thread 27 of the stub-shaft to move the drum and the bushing 30 axially on the stub-shaft toward the turret 22, against the force of the spring 29, when the drum is rotated in one direction, and to permit the spring to move the drum axially in the other direction when the drum is reversely rotated. The screw threads are adapted to pass out of mesh with each other and thus permit further rotation of the drum without substantial axial movement when it closely approaches the turret. An annular retaining plate 33, mounted upon the neck 24 of the stub-shaft and secured to the hub of the drum by screw bolts, is adapted to abut the journal portion 25 of the stub-shaft to stop the reverse axial movement of the drum with the screw threads still meshed.

Formed upon the standard 20$^a$ is an arm 34 projecting toward the guide and presser roll 14 and formed on its inner face with a stop or socket 35 adapted to engage one after another of the projecting bushings 30 of the drum assemblies as the turret revolves, to stop the turret with one after another of each set of drums 31 bearing against the stock strip 13 upon the guide and presser roll 14, with the latter forced away from the stops 18, the drum thus sustaining the force of the pull springs 19 to effect the pressing of the stock against the drum by the said roll.

A friction drive including a drive roller 36 bearing frictionally against and adapted to slip upon the periphery of the turret 22 is provided for urging the latter to rotate, clock-wise as viewed in Fig. 1 to bring successive pairs of drums into coaction with the roll 14. The latter, driven by the conveyor 12, is adapted to drive the drum on the latter's own axis while guiding and pressing the stock strip 13 thereonto, and thus, through the action of the screw threads 27, 32, to cause a slow axial movement of the drum toward the turret, such as to give the winding of stock upon the drum a helical form, and at the proper time to cause disengagement of the bushing 30 from the stop 35 and thus permit rotation of the turret by the friction drive roller 36 to bring the next drum into stock-receiving position.

Journaled in spring backed journal blocks 37, 37, slidably mounted in the tops of the standards 20, 20$^a$, is a pair of driven coating rolls 38, 38, adapted to bear upon the work as successive pairs of drums 22 with the windings or wrappings of the strips 13 thereon are brought to the top of the turret's orbit. A tank 39 is mounted upon the standards 20, 20$^a$, and provided with drip cocks 40, 40, adapted to supply coating material to the rolls 38. The latter are of such length and are so positioned as to leave uncoated a margin 13$^b$ of the work while coating the rest of its outer surface.

Each of the drums 31 is preferably provided with a vulcanized rubber band 41 on its stock-receiving surface, the band being anchored to the drum along its middle portion and unattached along its margins, and thus adapted to serve as a liner for the tacky rubber stock in the winding of the latter on the drum and the folding over of the margins of the rubber winding to tube form.

In the beginning of the operation of this embodiment of my invention, the calender being operated to deliver the strips 13, the friction drive roller 36 and the coating rolls 38 being continuously driven, and the turret being stopped with one pair of the drums held in cooperative relation to the guide and presser roll 14 by engagement of the projecting bushing 30 with the stop 35, the drums of the pair being in their positions farthest from the turret, the leading end of each stock strip 13 is passed about the roll 14 while the latter is held away from the drums by hand, and is started upon the drum, at the position shown by broken lines in Fig. 1. The springs 19 are then allowed to pull the roll 14 against the drums, which are thereupon driven by said roll, the latter being driven by the conveyor 12, and the strips 13 are thus wound upon the respective drums, the screw threads 27, 32, functioning to move the drums axially toward the turret as they are rotated, so that the stock strip is wound helically upon each drum, providing a lateral offset of successive plies, as is shown clearly in Fig. 3.

At the end of approximately two revolutions of the drum the bushing 30 engaged with the stop 35 has been moved toward the turret, by the axial movement of the drum, sufficiently to clear it from the stop 35, whereupon the friction drive roller 36 becomes effective to rotate the turret to step the turret forward one-third of a revolution, the bushing 30 of the next drum stopping this movement by abutting the stop 35 and causing the drive roller 36 to slip.

This partial revolution of the turret causes each strip 13 to start to wind upon the set of drums as a group and thus to extend tangentially from one drum to the next, as shown in Fig. 1, and as the turret stops with the second drum in stock-receiving position and the first drum at the coating position, an operator severs the strip at 42, Fig. 1, and by hand applies the severed end portions to the respective drums, as indicated by the broken lines in Fig. 1.

The two drums immediately begin to be driven on their own axes by the guide and presser roll 14 and the adjacent coating roll 38 respectively, the action being the same as to the two sets of drums on opposite sides of the turret, and while the winding as described is being repeated upon the newly arrived drum at stock-receiving position the winding of stock upon the first drum, now at the top of the turret's orbit, is compacted by the coating roll 38 and provided on its outer face except along the margin 13ᵇ with a coating of adhesion-preventing material from the tank 39, a solution of such material in a volatile solvent, such as a solution of stearic acid in alcohol, preferably being used.

At the next indexing of the turret the first drum with its coated winding of stock thereon is stopped at the folding position, which is the position of the drum farthest to the right in Fig. 1, and there the margins of the winding are folded over to its middle zone and there joined in interfitted relation, so that the seams of the respective plies are mismatched, as shown clearly in Fig. 5.

Preferably before each winding reaches the coating position a valve-stem patch 43 is applied to one margin of the winding with an overhang therefrom, as shown in Figs. 1, 2 and 3, and the valve stem hole 44 (Fig. 3) is punched through the patch and the underlying winding, the patch then being in position to bridge the seam when the margins of the winding are brought together and joined as described. The valve stem may be put into the tube, 13ª, for subsequent mounting in the valve stem hole thereof, by laying it upon the winding so that it will be enclosed when the margins of the latter are folded over and joined.

The seam of the tube is rolled with a hand roller 45 (Fig. 4), the drum being rotated by hand to facilitate this operation, and being finally so turned that the retaining plate 33 abuts the journal portion 25 of the stub-shaft.

The tube is then removed from the drum for vulcanization before the tripping of the bushing 30 of the preceding drum from the stop 35 permits the next indexing of the turret.

Thus the operation is continued to produce successive tubes from the continuously delivered calendered strips 13.

In the embodiment of my invention shown in Fig. 6 the guide and presser roll 14 of the embodiment above described is omitted and the tube building drums, 46, 46, are journaled with limited axial play upon the arms of spider turrets 47, 47, which are journaled upon vertical axes upon respective standards 48, 48, at opposite sides of the delivery end of the conveyor 12, the drums thus being adapted to be brought in succession into a slightly oblique stock-receiving position upon the conveyor 12 so as to be driven thereby and to pick up therefrom as helical windings tube-forming lengths of stock 49 carried by the conveyor from the calender. The said lengths are preferably caused to be spaced apart longitudinally upon the conveyor, as by cutting out sections of the continuous strips as indicated by the vacant spaces 50, 50. Springs 46ª, 46ª are mounted upon the spindles of the turret to return the respective drums to their outermost positions when they are lifted from the conveyor.

To cause the turret to rise and fall as it is rotated, so as to lower the adjacent drum onto the conveyor at the end of each indexing movement and lift it therefrom at the beginning of each indexing movement, and to hold it with the drum in proper oblique position to effect the helical winding of the tube blank thereon, the turret is slidably journaled upon the standard and is provided with a hub cam 51 adapted to coact with rollers 52, 52 journaled on the standard.

A coating roller 38, which may be provided with supporting and fluid-supplying means such as are shown in the embodiment illustrated in Figs. 1 to 5, is provided.

The operation of this embodiment is the same as that above described with relation to the embodiment of Figs. 1 to 5, as to the manipulation of the windings of stock, and in all other respects will be obvious from the foregoing description of the structure.

Both embodiments provide the advantages set out in the above statement of objects.

Further modifications may be employed within the scope of my invention, and I do not wholly limit my claims to the embodiments here shown.

I claim:

1. Apparatus for making inner tubes for tires, the said apparatus comprising a substantially cylindrical form of a diameter such as to receive as a winding thereon a strip of tube-forming stock to be formed as an inner tube by the joining of its margins in a longitudinal seam, a support for the strip of stock, the said support having an upwardly facing surface of such extent as at the same time to support in spread condition thereon, against gravity, substantially the entire strip, and means for effecting such relative movement of the support and the form as to cause the strip to be wound upon the form by relative running of the form upon the support.

2. Apparatus as defined in claim 1 in which the form is mounted in oblique relation to the stock-engaging surface of the support.

3. Apparatus as defined in claim 1 in which the strip-supporting means comprises an endless belt conveyor for the strip.

4. Apparatus as defined in claim 1 including a plurality of the forms and a turret constituting a mounting for the several forms.

5. Apparatus for making inner tubes for tires, the said apparatus comprising a turret, a set of substantially cylindrical winding forms mounted on said turret and each of a diameter such as to receive as a winding thereon a strip of tube-forming stock to be formed as an inner tube by the joining of its margins in a longitudinal seam, means for winding such strips of stock onto the forms at one part of the turret's orbit, and means for applying an adhesion-preventing material to the strips at another part of the turret's orbit.

6. Apparatus as defined in claim 5 in which the means for winding the strips onto the forms comprises a member adapted to support the strip in longitudinally spread condition and relatively to run upon the form to give off the strip thereto.

In witness whereof I have hereunto set my hand this 18th day of August, 1925.

JOHN O. GOODWIN.